United States Patent [19]

Sprague

[11] 4,376,568
[45] Mar. 15, 1983

[54] THICK FILM LINE MODULATOR
[75] Inventor: Robert A. Sprague, Saratoga, Calif.
[73] Assignee: Xerox Corporation, Stamford, Conn.
[21] Appl. No.: 224,244
[22] Filed: Jan. 12, 1981
[51] Int. Cl.³ .............................................. G02F 1/03
[52] U.S. Cl. .................................... 350/356; 350/354
[58] Field of Search ......................... 350/356, 354, 96

Primary Examiner—William L. Sikes
Assistant Examiner—Leon Scott
Attorney, Agent, or Firm—Franklyn C. Weiss

[57] ABSTRACT

A thick film line modulator/scanner (50) for use in an electro-optic line printer (14). A light valve utilizes a thin electro-optic layer (212) with the index of refraction of the layer being higher than the neighboring material so that the light can be guided in it. A laser beam (48) is focused into the layer, the beam expanding sideways so that a sheet of collimated light is provided. This light is affected by an array of electrodes (240, 242), consisting of an extended set of individually addressed metal fingers (240) on one side of the film (212), and a broad electrode (242) on the other side of the film. This broad electrode could also be segmented to the individually addressed electrodes. The light diffracted by this electrode set is reimaged onto the recording medium (14) with the zero order diffracted light blocked out, so that each electrode acts as a light modulator for one picture element on the output.

5 Claims, 4 Drawing Figures

THICK FILM LINE MODULATOR

A thick film light modulator for use in line printers, and more particularly, in electro-optic line printers.

The invention relates to a thick film light modulator for use in providing information modulated light to a photosensitive recording surface; the recording surface being exposed in an image configuration for subsequent development and use.

BACKGROUND OF THE INVENTION

It has been shown that an electro-optic element having a plurality of individually addressable electrodes can be used as a multigate light valve for line printing. See, for example, a copending and commonly assigned United States Patent Application of R. A. Sprague et al, which was filed June 21, 1979 under Ser. No. 40,607 on a "TIR Electro-Optic Modular With Individually Addressed Electrodes". Also see "Light Gates Give Data Recorder Improved Hardcopy Resolution", *Electronic Design*, July 19, 1979, Pages 31–32; "Polarizing Filters Plot Analog Waveforms", *Machine Design*, Volume 51, Number 17, July 26, 1979, Page 62; and "Data Recorder Eliminates Problem of Linearity", *Design News*, Feb. 4, 1980, Pages 56–57.

The same inventor in a copending and commonly assigned United States Patent Application of R. A. Sprague, Ser. No. D79006 on "An Electro-Optic Line Printer" disclosed the support optics and electronics for incorporating a multi-gate light valve into a line printer. The present invention is an extension of the invention set forth in Ser. No. D79006 and the specification and drawings thereof are herein incorporated by reference.

In copending application Ser. No. D79006 it is disclosed that almost any optically transparent electro-optic material can be used as the electro-optic element of such a light valve as disclosed herein. Presently, the most promising materials appear to be $LiNbO_3$ and $LiTaO_3$, but there are other materials which qualify for consideration, including BSN, KDP, $Ba_2NaNb_5O_{15}$ and PLZT. In any event, the electrodes of such a light valve are intimately coupled to the electro-optic element and are distributed in non-overlapping relationship widthwise of the electro-optic element (i.e., orthogonally relative to its optical axis,) typically on equidistantly separated centers so that there is a generally uniform interelectrode gap spacing.

To perform line printing with a multi-gate light value of the foregoing type, a photosensitive recording medium such as a xerographic photoreceptor is exposed in an image configuration as it advances in a cross line direction (i.e., a line pitch direction) relative to the light valve. More particularly, to carry out the exposure process, a sheet like collimated light beam is transmitted through the electro-optic element of the light valve, either along its optical axis for straight through transmission or at a slight angle relative to that axis for total internal reflection (TIR). Furthermore, successive sets of digital bits or analog signals samples (hereinafter collectively referred to as "data samples"), which represent respective collections of picture elements or pixels for successive lines of the image, are sequentially applied to the electrodes. As a result, localized electric bulk or fringe fields are created within the electro-optic element in the immediate vicinity of any electrodes to which non-reference level data samples are applied. These fields, in turn, cause localized variations in the refractive index of the electro-optic element within an interaction region (that is , a light beam illuminated region of the electro-optic element which is subject to being penetrated by the electric fields). Thus, the phase front or polarization of the light beam is modulated in accordance with the data samples applied to the electrodes as the light beam passes through the interaction region.

In copending application Ser. No. D79004, herein incorporated by reference, is disclosed a thin light modulator for use in such an electro-optic line printer. According to the invention set forth therein the light valve utilizes a thin electro-optic film on a substrate, with the index of refraction of the film being higher than the substrate so that the light can be guided in it. A laser beam is caused to be guided in the film through one of the many ways noted in the literature. This beam is expanded sideways either before or after coupling into the film so that a sheet of collimated light is provided. This light is guided beneath an array of electrodes identical to the array described in copending application Ser. No. D79006, as herein incorporated by reference, which consists of an extended set of individually addressed metal fingers. As set forth in said copending applications, the light diffracted by the electrode set is reimaged onto the recording medium, with the zero order diffracted light blocked out, so that each electrode acts as a light modulator for one picture element on the output. Alternatively, the zero order is reimaged and diffracted light blocked out. By applying each bit of a serial stream of data to each electrode after serial to parallel conversion, a line recording is achieved.

The present invention, on the other hand, is an alternative embodiment of the total internal reflection light modulator/scanners described in the above identified copending patent applications. In these patent applications, a line of light was modulated spatially by an array of electrodes placed near or on an electro-optic crystal, with an individual driver attached to each individually addressable electrode, to achieve recording of digital data on a light sensitive material. In these other disclosures, the light was totally internally reflected from the active surface, achieving interaction with fringing electric fields as it passed near the surface of the material at close to grazing incidence. According to the present invention, the electro-optic crystal is polished to form a thin sheet of material, with the light focused into the material in two different ways to achieve interaction with the electric field, which is either a fringing field or a parallel transverse field as described herein. This particular device configuration is distinctly different from the thin film version of the modulator/scanner which was described in the copending application Ser. No. D79004, in which light is coupled into a guided mode in a thin film device. The thick film version may involve multiple bounces off one or two TIR surfaces but does not make use of guided modes. The thick film version of the present invention has the potential advantage in that it works at low voltages with high diffraction efficiency, without the problems encountered in coupling light efficiently into a thin film. In addition, the parallel field version of the device has potential for substantially reducing the total length of a device having a fixed number of resolvable elements.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
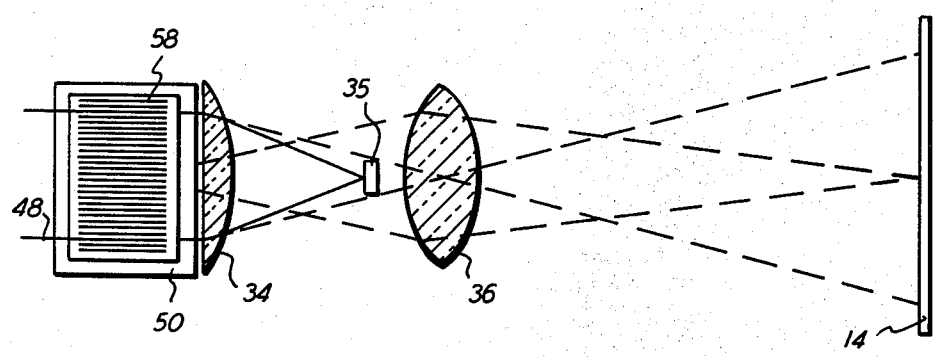
FIG. 1 is a top view of the electro-optic modulator/scanner as set forth in the copending applications.

FIG. 1 shows the top view of the basic electrode and read out configuration for this type of line modulator, as previously described in the copending applications identified above. A set of parallel electrodes 58 is placed on an electro-optic crystal 50, which each electrode controlled by a separate voltage source whose drive level depends on one pixel value across a scan line. See copending and commonly assigned application of Turner and Sprague, "Differential Encoding For Electro-Optic Line Printers", Ser. No. D79186. This driver, not shown, but fully set forth in the copending applications identified above, is either addressed in parallel from a number of data lines, or in the case of a line image recorder is probably addressed by high speed multiplexers with the others from a shift register or registers which convert serially data to parallel drive levels. Light 48, as from a laser, is caused to interact with the field produced by each electrode as shown in FIG. 1. The local purturbation of the light by the electric field is caused by a read out technique to turn the light on or off in the recording plane at the image position of each electrode. The read out scheme described herein and shown in the figures is the dark field case, where the straight through light is blicked out by a stop 35 and the rest is reimaged onto the output. See particularly, said copending application Ser. No. D79004 as herein incorporated by reference. Other alternative techniques mentioned or described in these copending applications could also be used such as polarization readout, phase contrast, or bright field. The basic premise is that each electrode modulates the light at one recording spot position and is held at the appropriate recording valve for an entire line time. See the sample and hold circuit described in said copending application Ser. No. D79006.

Figure 2A:
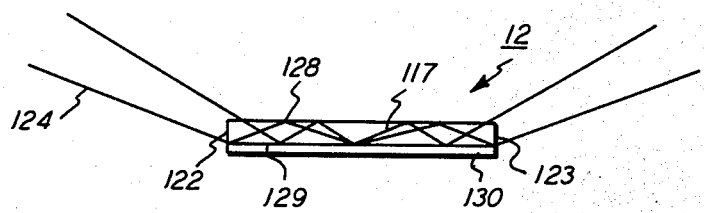
FIGS. 2a to 2c are various illumination configurations of the electro-optic crystal seen in FIG. 1.
Figure 2B:
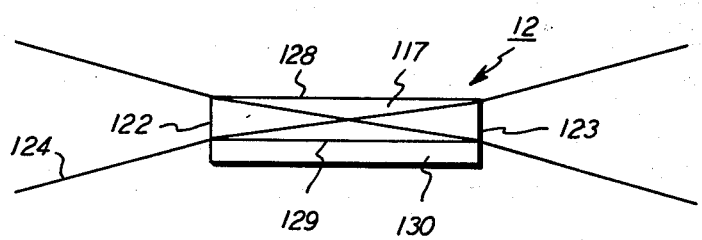
Figure 2C:
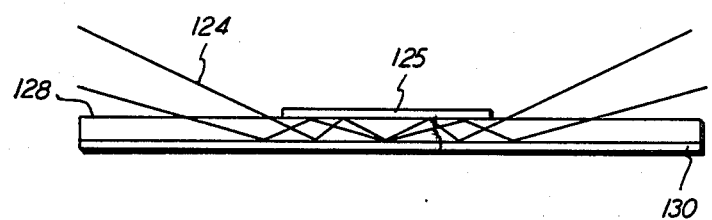

FIG. 2 shows the side view of the electro-optic modulator/scanner device 12 in three possible illumination configurations as seen in FIGS. 2a, 2b, and 2c. As fully set forth in said copending applications, the crystal 117 is a thin slab of electro-optic crystal, probably lithium niobate or lithium tantalate, which has been polished on two surfaces 128, 129 to make a relatively thin device, probably but not exclusively in the range between 0.001 (0.0254 mm) and 0.002 (0.0508 mm) inches thick. Electrodes are placed on the lower surface 129 of this thin slab either by fabricating them directly on the device or most likely by fabricating them on an LSI electrode driver circuit 130 and placing the electrode bearing circuit in proximity to the surface as shown in the figure. See copending application D79007, herein incorporated by reference. Light 124 is then caused to interact with the electric field produced by the electrodes in three possible ways. In FIG. 2a, for example, the light is focused into the end 122 of the crystal 117 so that it totally internally reflects from the surface near the electrodes. This is a similar interaction to that described in the copending applications but may be enhanced by multiple reflection of the converging beam off the two device surfaces so that the interaction occurs more than once along the optical path. This results in lower drive voltages and/or higher diffraction efficiency. The multiple interaction and thus longer path length also provides for better control of spot overlap for oversampled recording, since diffraction along the length of the electrodes broadens each spot.

In FIG. 2b, the light 124, as from a laser as set forth above, is focused onto the crystal 117 and is directly transmitted by the device without reflection. This configuration avoids problems with defects on the surface of the electro-optic crystal but will have lower diffraction efficiency if fringing field electrodes are used. Its prime use will be in the parallel field device configuration as described hereinbelow.

FIG. 2c shows a third alternative configuration in which the input light 124 is not coupled through the end of the electro-optic slab but through the polished broad upper surface 128. See Ser. No. D79004, as set forth above. It is then caused to reflect off the surfaces of the slab a number of times by coating the surface with a reflective layer 125, which may be metal where it does not interfere with the electrode structure; it may be a multi-layer dielectric mirror; or it may be simple surface reflection at a high to low index boundry. The upper mirror 125 is limited in spatial extent as shown so that the input and output beams can pass by it to get in and out of the crystal. It is apparent that the input or output beams could also come through the other end of the upper surface 128 of the slab. The advantage of this configuration is that it achieves the same long interaction length achieved in FIG. 2a without optical problems caused by a poor edge on the thin surface of the crystal which is difficult to polish.

Figure 3A:
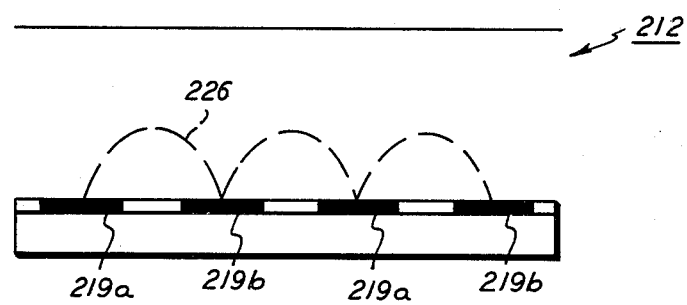
FIGS. 3a to 3b are various side view drawings of the eletro-optic crystal as magnified to see the electrode structure in conjunction with the electro-optic crystal of FIG. 2.
Figure 3B:
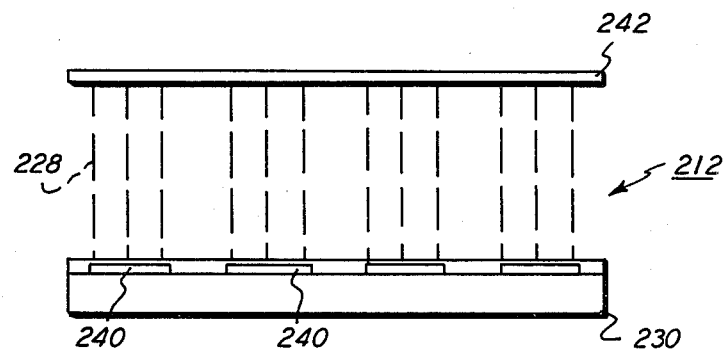

The electrode configurations to be used with the devices in FIG. 2 can take two formats as shown in the enlarged end views of the device in FIG. 3. FIG. 3A, for example, shows the electrode format which uses fringing fields to obtain electro-optic interaction. This is the format which has been described in the copending applications noted above. A differential voltage is applied to two neighboring electrodes 219a, 219b producing a fringing field 22k6 between them which extends a certain distance into the crystal 212. Again, see Ser. No. D79186. In this configuration, the only electro-optic interaction occurs in the space between the electrodes and the minimum spacing of electrodes is equal to one line length plus one gap. FIG. 3B shows an alternative configuration, in which a broad electrode is placed on the opposite side of the crystal slab. In this case, the field produced is a parallel field 228 across the crystal slab 212 between the individual electrodes 240 and the broad electrode 242 which is probably grounded. This broad electrode 242 could also be segmented to correspond to the individual electrodes. The field produced in this way extends the full depth of the crystal and is thus easier to interact with than the fringing field which only extends a small distance into the crystal. The field strength produced at any point is also correspondingly reduced, so that a longer interaction length is needed for the same diffraction efficiency. The potential advantage of this technique is that lower drive voltages may be obtainable, since this longer path length is easily obtained in the parallel field device using the configuration shown in FIG. 2.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In an electro-optic printer having a multi-gate light valve (12) for phase front or polarization modulating a sheet-like collimated light beam (124) in accordance with input data samples of finite duration representing individual picture elements of an image, and phase or polarization sensitive optics (34) for imaging the modulated light beam onto a photosensitive recording medium (14) as said recording medium advances in a crossline direction relative to said light-valve, whereby said recording medium is exposed in an image configuration, wherein the improvement is characterized by:

said light valve comprising a substrate (130) containing an optically transmissive electro-optic film (212), drive electrodes (240) in the form of a plurality of individually addressable electrodes formed on the substrate (230) between the substrate and said electro-optic film (212), a broad electrode (242) on the opposite surface of said electro-optic film (212) from the drive electrodes (240) such that when said light beam (124) is focused into said electro-optic film (212) at one end thereof said light passes between said drive electrodes (24) and said broad electrode (242), said individually addressable electrodes (240) creating parallel electric fields within said electro-optic film to phase front modulate said light beam.

2. The electro-optic line printer of claim 1 wherein said broad electrode (242) is connected to ground.

3. The electro-optic line printer of claim 1 wherein said broad electrode (242) is segmented to correspond to the individual drive electrodes (240).

4. The electro-optic line printer of claim 3 wherein the light diffracted by said individually addressable electrodes is imaged onto said recording medium with the zero order diffracted light blocked out such that each electrode pair acts as a light modulator for one picture element.

5. The electro-optic line printer of claim 3 wherein the light diffracted by said individually addressable electrodes is imaged onto said recording medium with the higher order diffraction components of the light blocked out such that each electrode pair acts as a light modulator for one picture element.

* * * * *